March 11, 1947.  E. PETRAKAKIS  2,417,266
TOASTER
Filed Feb. 16, 1945

INVENTOR
Emanuel Petrakakis
BY
Blair, Curtis + Hayward
ATTORNEYS

Patented Mar. 11, 1947

2,417,266

UNITED STATES PATENT OFFICE 2,417,266

TOASTER

Emanuel Petrakakis, New York, N. Y.

Application February 16, 1945, Serial No. 578,218

1 Claim. (Cl. 99—447)

This invention relates to a toaster that is adapted to be placed on an electric cooking top.

An object of the invention is to provide a toaster which may be used for toasting bread, in which the bread is subjected to heat of convection and radiant heat in such proportions that the bread will be completely toasted over its entire surface exposed to the heat before it is dried.

A further object of the invention is to provide for the supplementing of the radiant heat that passes to the bread directly from the source by reflected radiant heat which originates at the source.

I have illustrated and described an embodiment of my invention but it is to be understood that I do not wish to be limited to the precise details illustrated as it is obvious to those skilled in the art that details of construction may be varied within the scope of the claim.

Figure 1:
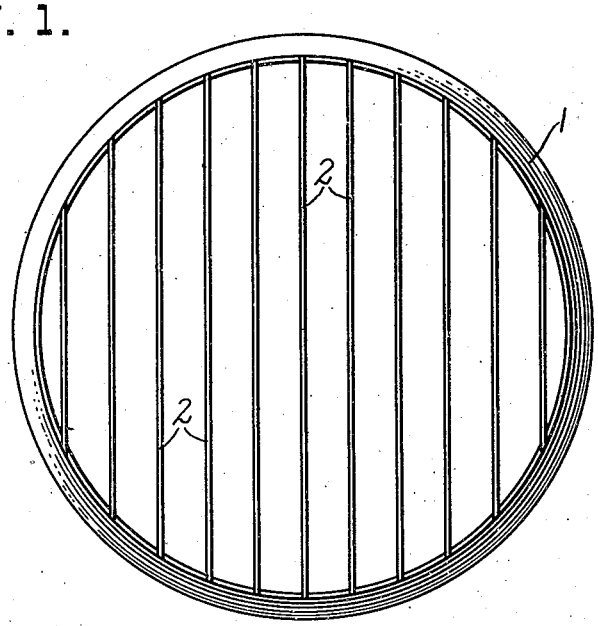
Figure 1 is a plan view of my device.
Figure 2:
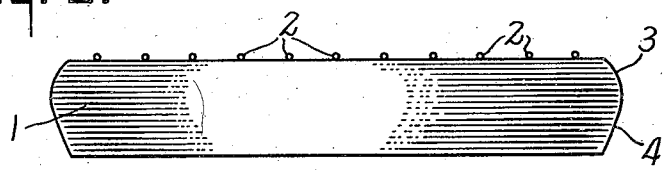
Figure 2 is a side elevation thereof.
Figure 3:
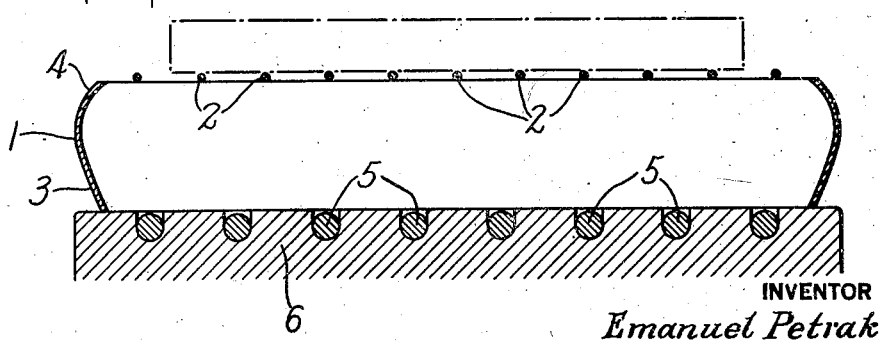
Figure 3 is a vertical section showing it in position on a cooking top and showing in dotted lines the position of a slice of bread that is in position to be toasted.

The toaster consists essentially of a wall 1 that is preferably circular in horizontal section and a grid 2 which is secured to the wall adjacent the open top end thereof, and is adapted to support the slice of bread that is to be toasted. This grid may take many forms but I have illustrated it as being made up of a plurality of metallic wires that have, preferably, a shiny surface capable of reflecting radiant heat.

The wall 1 is, preferably, of an upwardly divergent form from its lower end, as indicated at 3, merging into an upwardly convergent form, as indicated at 4.

As I have illustrated this wall both portions 3 and 4 have inner curved surfaces, the surface at 3 being struck on a greater radius than the surface at 4, so that the radiant heat from the cooking top will be directed to the under side of the bread.

The inner face of this wall 1 is formed of a metal having a shiny surface that is capable of reflecting the radiant heat from the cooking top, and the wall is so formed that the radiant heat from the cooking top will be reflected to the underside of the bread substantially evenly over its entire lower surface.

I have illustrated the toaster as placed on a cooking top which conventionally includes a coil or series of coils of electric resistance wires 5 carried by a suitable top or insulator 6, and when in this position the toaster will greatly accelerate the production of toast of an even overall texture.

It will be realized that the radiant heat from the coils 5 will pass directly to the under side of the bread as will also the heat of convection. The wall 1 will reflect radiant heat from the coils at various angles to the under side of the bread, thus greatly increasing the amount of radiant heat reaching the bread in relation to the heat of convection, with the result that the bread will be browned or toasted, by the radiant heat, before it will be dried out by the ambient heat.

This reflection of the radiant heat to the bread is due partly to the angles of inclination of the portions of the wall and partly to the fact that the inner surface of the wall, being of a shiny or polished metal, will contain numberless hills and dales, each having its own angle of reflection.

While I have described the invention as useful in the toasting of a slice of bread this, of course, is only for illustrative purposes, as it is obvious that other articles may be toasted thereon.

What I claim is:

A toaster including a continuous circular wall having an unbroken curved inner surface and open at its top and bottom, the lower portion of the inner surface of said wall being curved from the lower end of said wall in an outward direction and the upper portion of the inner surface of said wall being curved inwardly from the first mentioned portion to the open upper end of said wall on a radius less than the radius of curvature of the first mentioned portion, and a horizontal grid supported on and at the open end of said wall, the inner surface of said wall being shiny radiant heat reflecting.

EMANUEL PETRAKAKIS.

REFERENCES CITED

The following references are of record in the file of this patent:

UNITED STATES PATENTS

| Number | Name | Date |
|---|---|---|
| 338,097 | Miles | Mar. 16, 1868 |
| 2,368,026 | Jepson | Jan. 23, 1945 |
| 101,652 | Nobles | Apr. 5, 1870 |
| 1,036,148 | Reina | Aug. 20, 1912 |

FOREIGN PATENTS

| Number | Country | Date |
|---|---|---|
| 190,686 | Switzerland | July 16, 1937 |
| 663,826 | France | Apr. 15, 1929 |